United States Patent

[11] 3,561,380

[72] Inventor William J. Adams, Jr.
San Jose, Calif.
[21] Appl. No. 755,853
[22] Filed Aug. 28, 1968
[45] Patented Feb. 9, 1971
[73] Assignee FMC Corporation
San Jose, Calif.
a corporation of Delaware

[54] SEED PLANTER
5 Claims, 10 Drawing Figs.
[52] U.S. Cl. .................................................... 111/89,
111/36, 111/78, 222/177, 222/371
[51] Int. Cl. .................................................... A01c 7/18
[50] Field of Search .................................................... 111/91, 90,
95, 96, 77, 78, 34, 75, 36.89; 222/177, 220, 225, 371

[56] References Cited
UNITED STATES PATENTS
2,141,044  12/1938  Rassmann ..................... 111/34
2,845,884  8/1958   Clausing et al. ............... 111/91
3,208,413  9/1965   Dinges .......................... 111/34
3,343,507  9/1967   Smith ............................ 111/34X
2,510,658  6/1950   Rassmann ..................... 222/220X Primary Examiner—Robert E. Pulfrey
Assistant Examiner—C. Coughenour
Attorneys—F. W. Anderson and C. E. Tripp ABSTRACT: A seed planter for placing seed units, i.e., a single seed or a multiple seed packet, into the ground individually at zero ground speed, and at precise spacing and to desired depth. The planter includes a conveyor with pockets, each pocket to receive a single seed unit as the belt passes by a hopper. The seed depositing portion of the conveyor is in rolling or crawling ground engagement and a pusher assembly comprising a wheel or another belt moves along with the seed depositing portion so that a series of protuberances on the pusher assembly enter into the pockets to force the seeds into the ground.

PATENTED FEB 9 1971
3,561,380
SHEET 1 OF 3
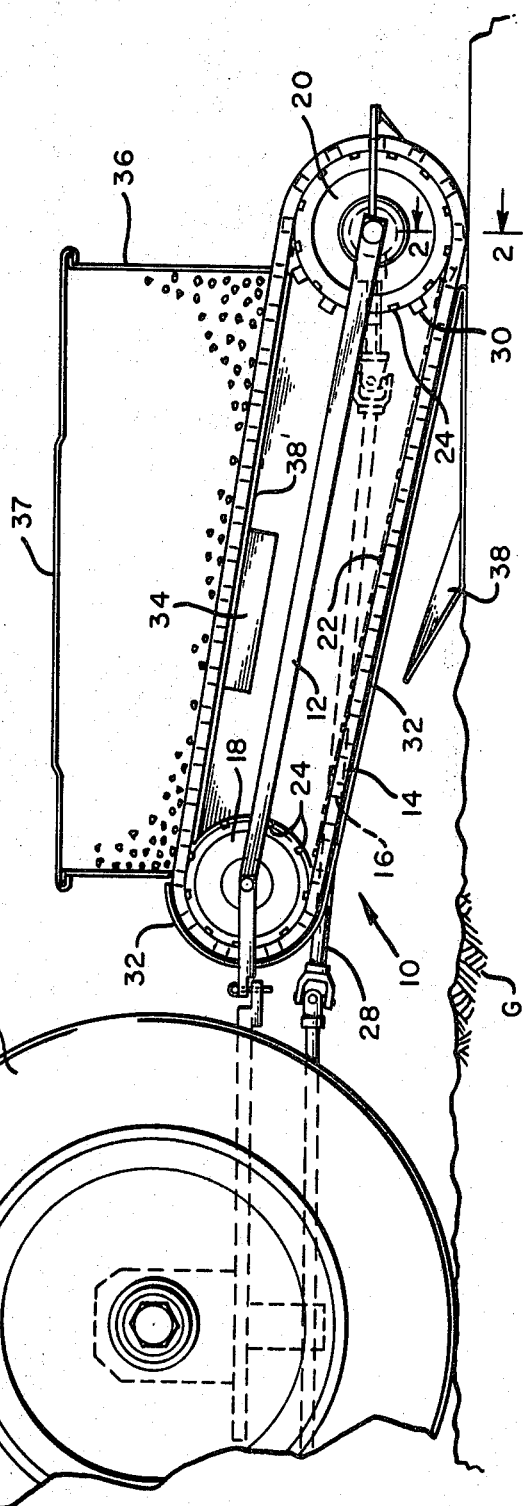
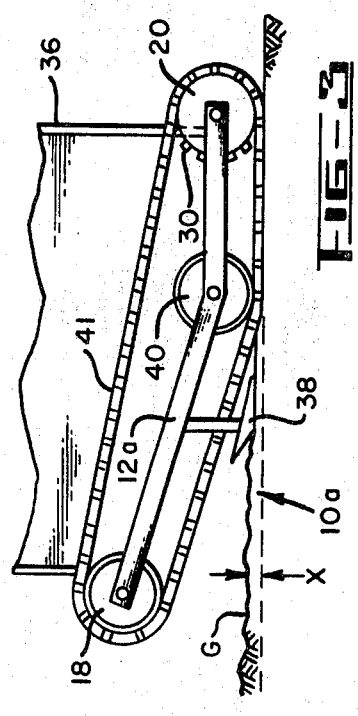
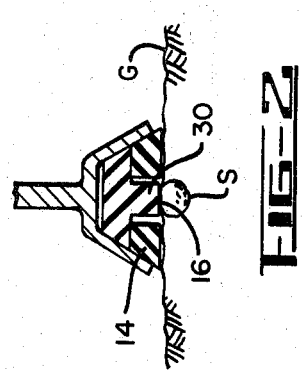
INVENTOR.
WILLIAM J. ADAMS, JR.
BY F. W. Anderson
C. E. Tripp
ATTORNEYS

INVENTOR.
WILLIAM J. ADAMS, JR.

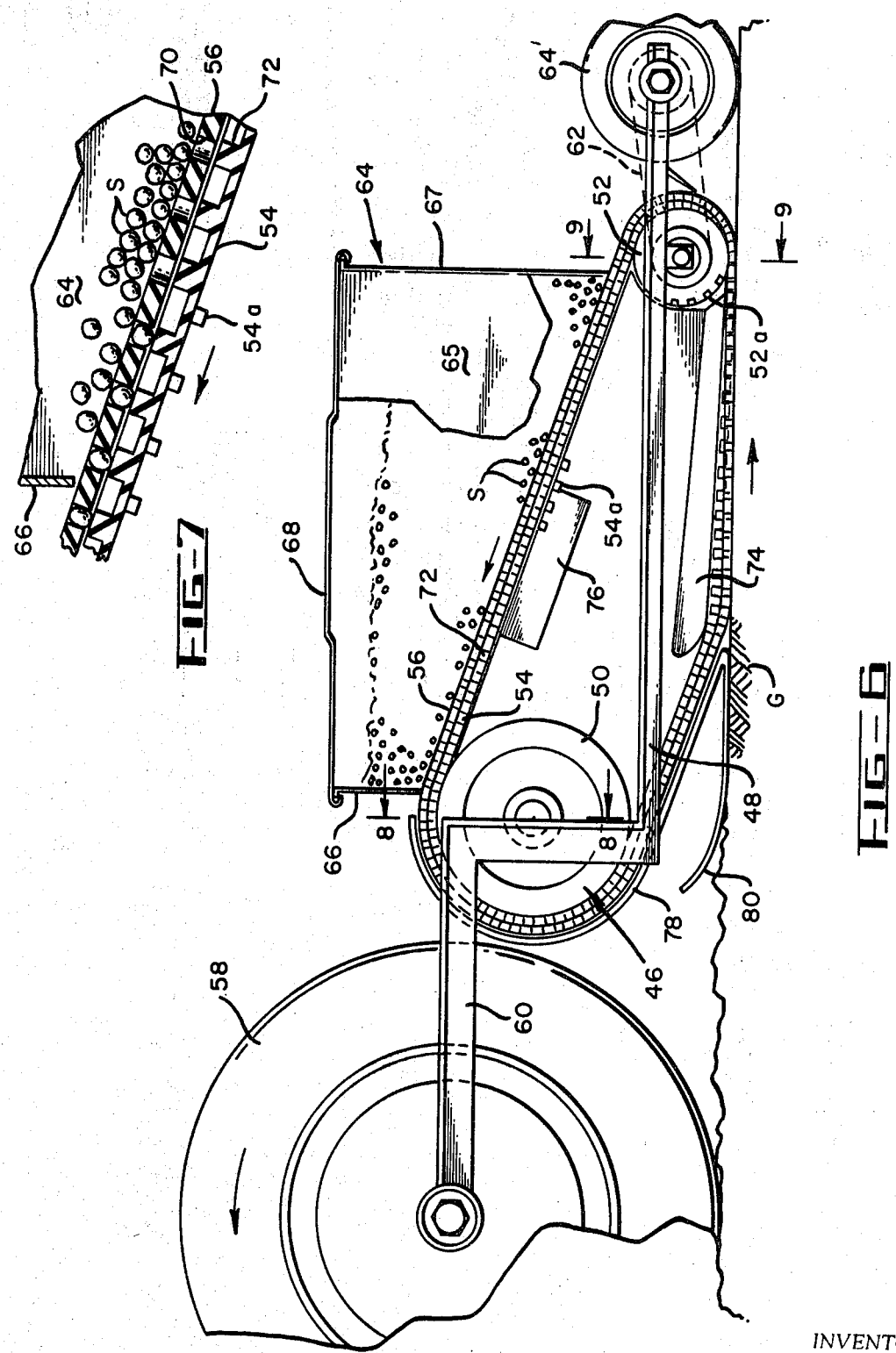

3,561,380

SEED PLANTER

BACKGROUND OF THE INVENTION

This invention relates to a seed planter, and more particularly, to a device for placing seeds into the ground individually at zero ground speed, and at desired spacings and depths.

Other known types of seed planters include belts, wheels or the like with pockets to receive seeds and drop them at defined intervals, but such devices are normally pulled along the ground by some vehicle with the seeds being dropped as the wheel or conveyor passes above the desired seeding location. However, the seed may bounce on the soil or a delivery chute, or otherwise be diverted from the precise spot in which it is desired to be placed. Moreover, such devices generally do no more than place the seed on the surface of the earth.

It is, therefore, an object of this invention to place a seed individually at a precise discreet spacing and at a desired depth.

It is a further object of this invention to singulate seed units and implant them individually at zero ground speed for precisely controlled placement.

SUMMARY OF THE INVENTION

In carrying out this invention, I provide a conveyor which may be an endless belt extended between and around a pair of spaced wheels, one of which carries the belt into rolling ground engagement. The belt contains one or more rows of holes or pockets so that when the belt passes under a hopper a single seed or seed unit is received in a pocket. A vibrator may be provided to facilitate loading the belt. The seeds are held in their pockets until the belt is in ground engagement, and since the belt is in rolling or crawling engagement with the ground, each pocket is at zero ground speed. A pusher assembly carries a corresponding row of lugs or protuberances which are aligned with the pockets and move along with them while they are in ground engagement. During this synchronized movement, the lugs are extended into the pockets to push the seed out of the pocket and into the ground to the desired depth. The pusher assembly may be an inner belt which is cammed outward to cause the protuberances to enter the pocket while in ground engagement, or it may simply comprise lugs on the ground engaging wheel.

Other objects of and advantages of this invention will become apparent from the description following when in conjunction with the accompanying drawings wherein:

FIG. 1 is a side elevation with parts broken away of a preferred embodiment of a seed planter including features of the present invention;

FIG. 2 is an enlarged partial section view taken along line 2—2 of FIG. 1 and showing a feature of the seed planter;

FIG. 3 is a partial side view of another embodiment of this invention;

FIG. 6 is a side elevation of another embodiment of this invention;

FIG. 7 is a partial section view showing a portion of a conveyor employed in the embodiment of FIG. 6;

Figure 10:
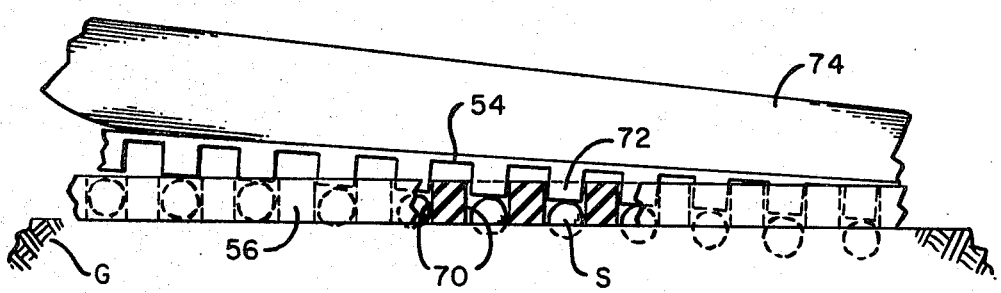
Figure 8:
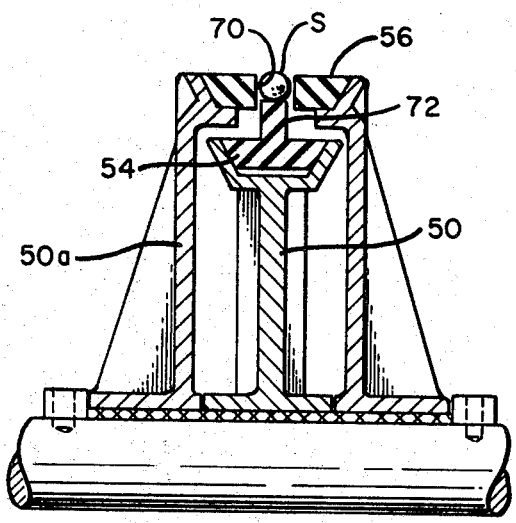
Figure 9:
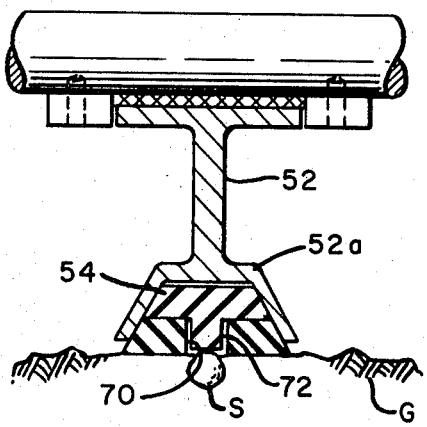

FIGS. 8 and 9 are section views taken along lines 8—8 and 9—9, respectively, of FIG. 6; and FIG. 10 is an enlarged view of a portion of FIG. 6; partially in section showing another portion of the conveyor.

DESCRIPTION OF THE PREFERRED EMBODIMENTS

Referring now to FIG. 1 there is shown the preferred embodiment of this invention wherein the seeder 10 comprises a frame 12 on which a single belt 14 with pockets or openings 16 is driven between a pair of wheels 18 and 20 as by means of timing lugs 22 carried on the under surface of the belt 14 and engaging in grooves 24 on the wheels 18 and 20. The seed planter 10 may be hitched to a tractor 26 and the belt 14 may be driven by any suitable means including simply ground engagement of the rear wheel 20. However, for purposes of illustration, we have shown a power takeoff 28 from the tractor drive (not shown) to drive the ground engaging wheel 20 in timed relation to the tractor 26. The belt 14 has preferably one, through it may have more, rows of seed unit openings 16 from which seed units are inserted into the ground by means of lugs 30 carried directly on the rear wheel 20. The lugs enter into the openings 16 after the belt 14 traverses a retaining shield 32 which prevents the seed units from dropping out prematurely. If desired, the belt 14 may be made somewhat resilient so that it is compressed under the weight of the rear wheel 20 if deeper implantation is desired. Alternately, the planting depth may be controlled by the lengths of the lugs 30. A vibrator 34 may be provided below the belt 14 as it traverses below the hopper 36 in order to facilitate loading of the belt from the hopper 36 which is covered at 37. A second shield 38' is provided under the belt 14 below the hopper 36 so that the seeds do not drop completely through the openings 16. Also, a plowlike shoe 38 is provided to smooth out the seed bed.

Referring now to FIG. 3 there is shown a modified planter 10a wherein a weighted roller 40 is rotatably mounted on the frame 12a in advance of the rear wheel 20 in order to compact the soil in advance of seed implantation. The amount of compaction is indicated by the dimension X.

Figure 4:
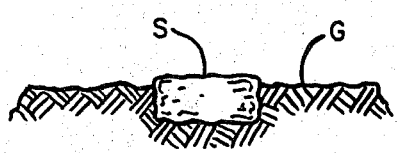
FIGS. 4 and 5 are schematic views of implanted seeds.
Figure 5:
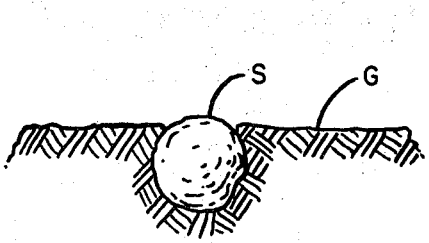

Although this invention is not so limited, the seeds S are preferably encapsulated with materials to improve germination and, if desired, may include fertilizers, fungicides or the like. Further in this connection, the term "seed" or "seed unit" as used herein is intended to embrace a seed capsule or package which may also contain additives as above described, and which may also contain a multiplicity of seeds within a single capsule. Since the seed units are forced into the ground while the belt is in rolling contact therewith, the seeds are at zero ground speed as they are implanted, and precise spacing is thus accurately controlled. As previously mentioned, the depth of planting may be controlled by the lengths of the lugs 30 or by the resilience of the belt 14. Experimentation has shown that there is an improved rate of germination when an encapsulated seed is planted within the appropriate range of depths shown in FIGS. 4 and 5.

Referring now to FIG. 6, another form of seed planter 46 includes a frame 48 on which is rotatably carried a pair of belt-driving wheels 50 and 52 between and around which are carried a pair of endless belts 54 and 56. The planting vehicle 46 may be propelled along the ground with the belts functioning in the nature of an endless belt crawler, when pulled by any suitable means such as a tractor, the rear wheel 58 of which is shown. The seed planting vehicle 46 may be attached to the tractor by a typical tool bar 60. The endless belts 54 and 56 may be driven by direct rolling contact with the ground or they may be driven by a suitable positive drive 62 from a prime mover such as an auxiliary ground driven wheel 64', the drive connection being so designed that the rearward speed of the belts 54 and 56 equals the forward speed of the planting vehicle 46. Also, as in the embodiment of FIG. 1 lugs may be provided on the inner surface of the belt 54 to engage drive grooves 52a in the wheel 52. Also carried on the frame 48 is a seed hopper 64 with sidewalls 65 and front and rear walls 66 and 67, the lower ends of which are closely adjacent the belt 56 to prevent the inadvertent escape of seeds. A cover 68 may also be provided to enclose the seeds S.

As shown more clearly in FIGS. 7 to 10, the outer belt 56 has one or more rows of openings or pockets 70, each of which is of a size just large enough to accept one seed S as it passes below the open bottom of the hopper 64. As is apparent in FIG. 10, the inner and outer belts 54 and 56 must be driven in unison in order to insure insertion of the lugs 72 on the inner belt 54 into the pockets 70 in the outer belt 56 to push the seeds S into the ground G. This is accomplished by providing for at least partial engagement of the lugs 72 in the pockets 70 at all times. Normally, the belts 54 and 56 are separated by the resilient pad driving the outer belt 56 on a separate, larger sprocket 50a (FIG. 8), but when the belts move into ground engagement as shown in FIGS. 6 and 10 a cam 74 carried on the vehicle frame 48 forces the inner belt 54 toward the outer belt 56, causing the lugs 72 to protrude through the openings 70 while the openings are at zero ground speed and forcing the seeds S into the ground to the desired depth. As shown in FIG. 9, final and firm implantation is accomplished by the trailing ground engaging wheel 52 which is preferably provided with a wide rim to distribute the force over the width of the belt 54.

As the belts 54 and 56 move under the hopper 64 (FIG. 7) they may be joggled by a suitable vibrating device 76 which is supported on the frame 48 and is effective to facilitate loading the outer belt 56 with a single seed unit S in each pocket 70. Then as the outer belt continues forwardly from under the hopper in the direction of the arrows (FIGS. 6 and 7) it passes closely adjacent to the lower edge of the front hopper wall 66 so that any seeds which are not contained within the pockets are removed from the belt.

Thereafter, the belts pass under and then traverse over a guard 78 which prevents the seeds from falling until the outer belt 56 is in crawling engagement with the ground. After the belts traverse the guard 78 the seeds S are supported on the ground and are progressively inserted therein, again as shown in FIG. 10. Preferably a plowlike shoe 80, which may be a forward extension of the guard 78, is carried at the front of the vehicle 46 in order to smooth the surface of the ground and prepare the seed bed and to push clods aside.

While this invention has been described in conjunction with preferred embodiments thereof it is obvious that modifications and changes therein may be made by those skilled in the art without departing from the spirit and scope of this invention as defined by the claims appended hereto.

I claim:

1. A seed planter comprising: a seed hopper having an opening in the bottom thereof, a ground-engaging conveyor movable adjacent to the bottom of said hopper past said opening before engaging the ground, said conveyor comprising an endless belt between and around a pair of wheels, said belt engaging the ground in rolling contact under one of said wheels, and including a second endless belt extending between and around said wheels within said conveyor belt, means defining a row of open pockets in said conveyor, adapted to receive seeds from said hopper, means for retaining seeds in said pockets until said pockets are in seeding disposition with the opening therein engaging the ground, a series of protuberances on said second belt aligned with the pockets in said conveyor belt, and means biasing a portion of said second belt toward said conveyor belt to force said protuberances into said pockets while in seeding disposition.

2. In a seed planter, the combination comprising, a pair of endless belts comprising an outer belt and an inner belt, said outer belt having a plurality of pockets therein and said inner belt having a plurality of lugs, means to mount said belts for rotation with one portion of the outer belt at any instant engaging the ground for rolling contact therewith and with the lugs on the inner belt entering the pockets in the ground engaging portion of the outer belt, means to deposit seeds in the pockets of the outer belt, and means to hold the seeds in said pockets until the portion of the belt with said pockets reaches the ground.

3. In a seed planter, the combination comprising a pair of wheels, at least one of said wheels engaging the ground for rolling contact therewith, a pair of endless belts mounted on said wheels, one inside the other, the outer belt having a plurality of pockets therein and said inner belt having a plurality of protuberances thereon, said protuberances entering said pockets as the belts pass under the ground-engaging wheel, means to deposit seeds in said pockets of the outer pockets of the outer belt, and means to hold the seeds in said pockets until the portion of the belt with said seeded pockets reaches the ground.

4. In a seed planter, the combination comprising a pair of wheels, at least one of said wheels engaging the ground for rolling contact therewith, a pair of endless belts mounted on said wheels, one inside the other, and defining an upper run and lower run, the outer belt having a plurality of openings and the inner belt having a plurality of lugs in registration with said pockets, the lugs supporting seeds deposited in the openings on the upper run and the lugs ejecting seeds from the openings as the belts pass under the ground-engaging wheel, means to deposit seeds in the openings on the upper run, and means to hold the seeds in said openings until the portion of the outer belt with said seeded openings reaches the ground.

5. The seed planter of claim 4 including a cam inside the belts and mounted along the lower run thereof to urge the lugs of the inner belt into meshing relationship with the openings of the outer belt.

PO-1050
(5/69)

UNITED STATES PATENT OFFICE
CERTIFICATE OF CORRECTION

Patent No. 3,561,380          Dated February 9, 1971

Inventor(s) WILLIAM J. ADAMS, Jr.

It is certified that error appears in the above-identified patent and that said Letters Patent are hereby corrected as shown below:

Col. 1, line 43, delete "of", (first occurrence); line 44, after "when" insert -- read --;
Col. 4, line 14, before "pockets" insert -- seeded --.

Signed and sealed this 18th day of January 1972.

(SEAL)
Attest:

EDWARD M. FLETCHER, JR.      ROBERT GOTTSCHALK
Attesting Officer            Acting Commissioner of Patents